(12) United States Patent
Park et al.

(10) Patent No.: US 6,433,267 B2
(45) Date of Patent: Aug. 13, 2002

(54) METHOD FOR AUTOMATICALLY CREATING DANCE PATTERNS USING AUDIO SIGNALS

(75) Inventors: Young-Sik Park, Taegukwangyeokshi; Jeon-Man Park, Sungnam-shi, both of (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/847,707

(22) Filed: May 2, 2001

(30) Foreign Application Priority Data

May 2, 2000 (KR) ......................................... 2000-23573
Apr. 16, 2001 (KR) ......................................... 2001-20278

(51) Int. Cl.[7] ................................................ G10H 1/40
(52) U.S. Cl. ....................... 84/611; 84/667; 84/DIG. 12
(58) Field of Search ........................... 84/611, 612, 635, 84/636, 651, 652, 667, 668, 484, DIG. 12

(56) References Cited

U.S. PATENT DOCUMENTS 5,488,196 A * 1/1996 Zimmerman et al. ......... 84/612

FOREIGN PATENT DOCUMENTS

| EP | 0 823 270 A2 | 2/1998 |
|---|---|---|
| EP | 0 874 382 A1 | 1/2000 |
| KR | 0078623-1999 | 5/1999 |

* cited by examiner

Primary Examiner—Stanley J. Witkowski
(74) Attorney, Agent, or Firm—Dilworth & Barrese, LLP

(57) ABSTRACT

A method for automatically creating dance patterns using an audio signal of music, comprising: extracting power feature of an audio signal of each processing window by covering the audio signal with the processing window for analyzing the audio signal at regular intervals, and extracting the processing windows indicating a part having strong-beat power feature as beating window candidates; determining beating windows corresponding to the points where beating should be conducted according to predetermined dance pattern creating option, out of the beating window candidates; and assigning predetermined unique beating codes to the determined beating windows in order of dance patterns based on the dance pattern creating option, and creating beating data of the dance patterns using the beating codes and time information indicating a time interval between beating windows.

12 Claims, 5 Drawing Sheets

METHOD FOR AUTOMATICALLY CREATING DANCE PATTERNS USING AUDIO SIGNALS

PRIORITY

This application claims priority to an applications entitled "Device and Method For Automatically Generating Dance Pattern by Used Audio Signal" filed in the Korean Industrial Property Office on May 2, 2000 and assigned Ser. No. 2000-23573, and "Method for Automatically Generating Dance Pattern Using Audio Signal" filed in the Korean Industrial Property Office on Apr. 16, 2001 and assigned Ser. No. 2000-20278, the contents of which are hereby incorporated by reference.

BACKGROUND OF THE INVENTION

1. Field of the Invention

The present invention relates generally to a dance game, and in particular, to a method for creating dance patterns using an audio signal.

2. Description of the Related Art

Recently, a dance game such as DDR™ (Dance Dance Revolution) game is popular among the youth. In the dance game, a gamer dances to background music by stepping (foot-stomping or touching) at specific points according to dance patterns displayed on the screen of a game machine. The game machine includes a dance apparatus for use in a game room, a personal computer (PC), and a CD (Compact Disk) game apparatus. In general, the dance patterns are displayed on the screen as up-arrow (↑), down-arrow (↓), left-arrow (←) and right-arrow (→). Such dance game machines are disclosed in Korean patent publication No. 99-78623, entitled "Dance Game Apparatus and Step-on Base for Dance Game"; EP 0 823 270 A2, entitled "Video Dance Game Apparatus"; and EP 0 974 382 A1, entitled "Dance Game Apparatus and Step-on Base for Dance Game", the contents of all of which are hereby incorporated by reference.

Currently, the conventional dance game apparatus supports only a limited number of songs previously registered in the DDR package, and each song registered in the DDR package has its unique dance patterns which are previously determined. Accordingly, the gamer can enjoy the dance game by choosing only the songs (or music) registered in the DDR package.

Sometimes, however, the gamer desires to dance to his favorite music not registered in the DDR package. The conventional dance game apparatus, however, cannot meet these desires of the gamer if the music is not registered in the DDR package. Even though it may play the non-registered music, the dance game apparatus cannot create dance patterns matching to the music. Therefore, the gamer cannot enjoy dancing to the music not registered in the DDR package.

SUMMARY OF THE INVENTION

It is, therefore, an object of the present invention to provide a method for automatically creating dance patterns of music desired by a user, thereby enabling the user to enjoy dancing even to non-registered music.

To achieve the above and other objects, there is provided a method for automatically creating dance patterns using an audio signal of music. The method comprises: extracting power feature of an audio signal of each processing window by covering the audio signal with the processing window for analyzing the audio signal at regular intervals, and extracting the processing windows indicating a part having strong-beat power feature as beating widow candidates; determining beating windows corresponding to the points where beating should be conducted according to predetermined dance pattern creating option, out of the beating window candidates; and assigning predetermined unique beating codes to the determined beating windows in order of dance patterns based on the dance pattern creating option, and creating beating data of the dance patterns using the beating codes and time information indicating a time interval between beating windows.

Preferably, the dance pattern creating option includes a genre option of the music and a level option of the dance patterns to be created. Further, the dance pattern creating option includes a sample frequency option for analyzing the audio signal and a size option of the processing window.

Preferably, the level option of the dance patterns includes a number of concurrently created dance patterns, a number of dance patterns created over one piece of music, and maximum and minimum intervals between the dance patterns.

Preferably, the time information indicates a difference in number of the processing windows between a specific beating window and its preceding beating window.

Preferably, the beating window extracting step comprises calculating an average energy value of each processing window; primarily differentiating the average energy value and then secondarily differentiating the primary differential value; and extracting the processing windows having a negative secondary differential value as the beating window candidates.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
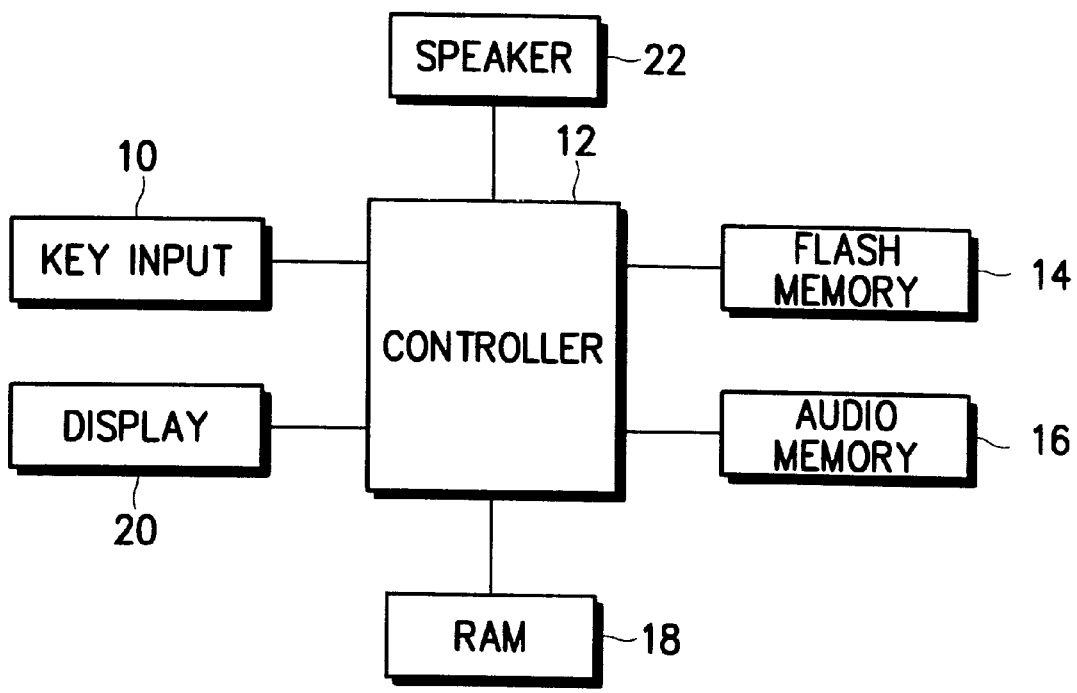
FIG. 1 is a block diagram illustrating an apparatus for automatically creating dance patterns, applied to an embodiment of the present invention.

FIG. 1 illustrates an apparatus for automatically creating dance patterns, applied to an embodiment of the present invention. Referring to FIG. 1, the automatic dance pattern creating apparatus includes a key input unit 10, a controller 12, a flash memory 14, an audio memory 16, a RAM (Random Access Memory) 18, a display 20, and a speaker 22. For example, such an automatic dance pattern creating apparatus is realized using a personal computer. The key input unit 10, including a mouse and a keyboard, generates a key input signal according to a dance pattern creating option, a menu selection command and a run command, input by the user, and provides the generated key input signal to the controller 12. The dance pattern creating option is used when the user designates an option of creating dance patterns, and this dance pattern creating option includes a genre option of the music and a level option of the dance patterns. The dance pattern creating option may also include a sampling frequency option and a size option of processing windows. For example, the genre option of the music is classified into random, disco, jazz and techno music. The level option of the dance patterns includes the number of concurrently created dance patterns, the total number of dance patterns created over one song, and the maximum and minimum intervals between dance patterns. The flash memory 14 stores a program for creating the dance patterns matching to the music (or song) selected by the user. In the audio memory 16 is previously stored audio data of various audio files, based on which the dance patterns are created. The user downloads audio data of the desired audio files from the Internet or an external device, and stores the downloaded audio data in the audio memory 16. Since a method for downloading the audio files from the Internet is well known in the art, a detailed description of the method will not be made. The RAM 18 temporarily stores data generated while the controller 12 runs the program for creating the dance patterns. The controller 12 displays icons and various data for creating the dance patterns on the display 20. Further, upon receipt of a dance pattern creation command from the key input unit 10, the controller 12 loads the dance pattern creating program from the flash memory 14 and creates dance patterns matching to the audio signal of the music selected by the key input unit 10. The controller 12 displays the created dance patterns on the display 20 and at the same time, reproduces the audio file and outputs the reproduced audio signal through the speaker 22.

Figure 2:
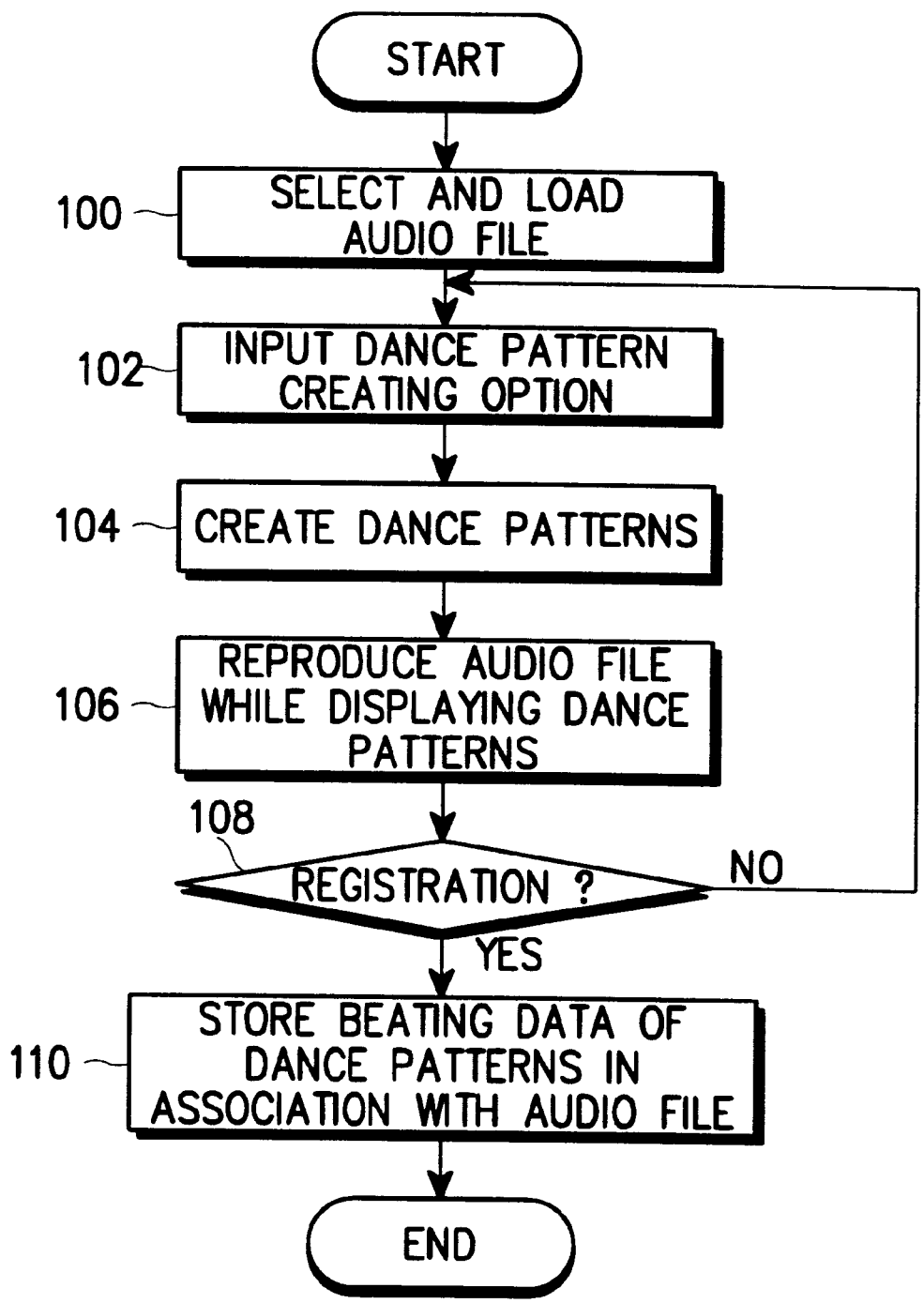
FIG. 2 is a flow chart illustrating a procedure for managing dance patterns according to an embodiment of the present invention.

Now, with reference to FIG. 2, a description will be made regarding how the controller 12 manages the dance patterns.

In step 100, the controller 12 reads an audio file selected by the user from the audio memory 16 and loads the read audio file on the RAM 18. At this moment, the controller 12 displays an icon for creating dance patterns on the display 20. If the user clicks this icon using the mouse of the key input unit 10, the controller 12 displays an audio file selection menu on the display 20. Subsequently, if the user clicks (or selects) a desired one of the audio files displayed on the display 20 using the mouse of the key input unit 10, then the controller 12 reads the audio file selected by the user from the audio memory 16 and loads the read audio file on the RAM 18. Thereafter, the controller 12 displays an input menu for inputting the dance pattern creating option on the display 20. If the user inputs the dance pattern creating option in step 102 and a run command (or execution command) through the key input unit 10, the controller 12 performs the dance pattern creating operation in step 104.

Figure 3:
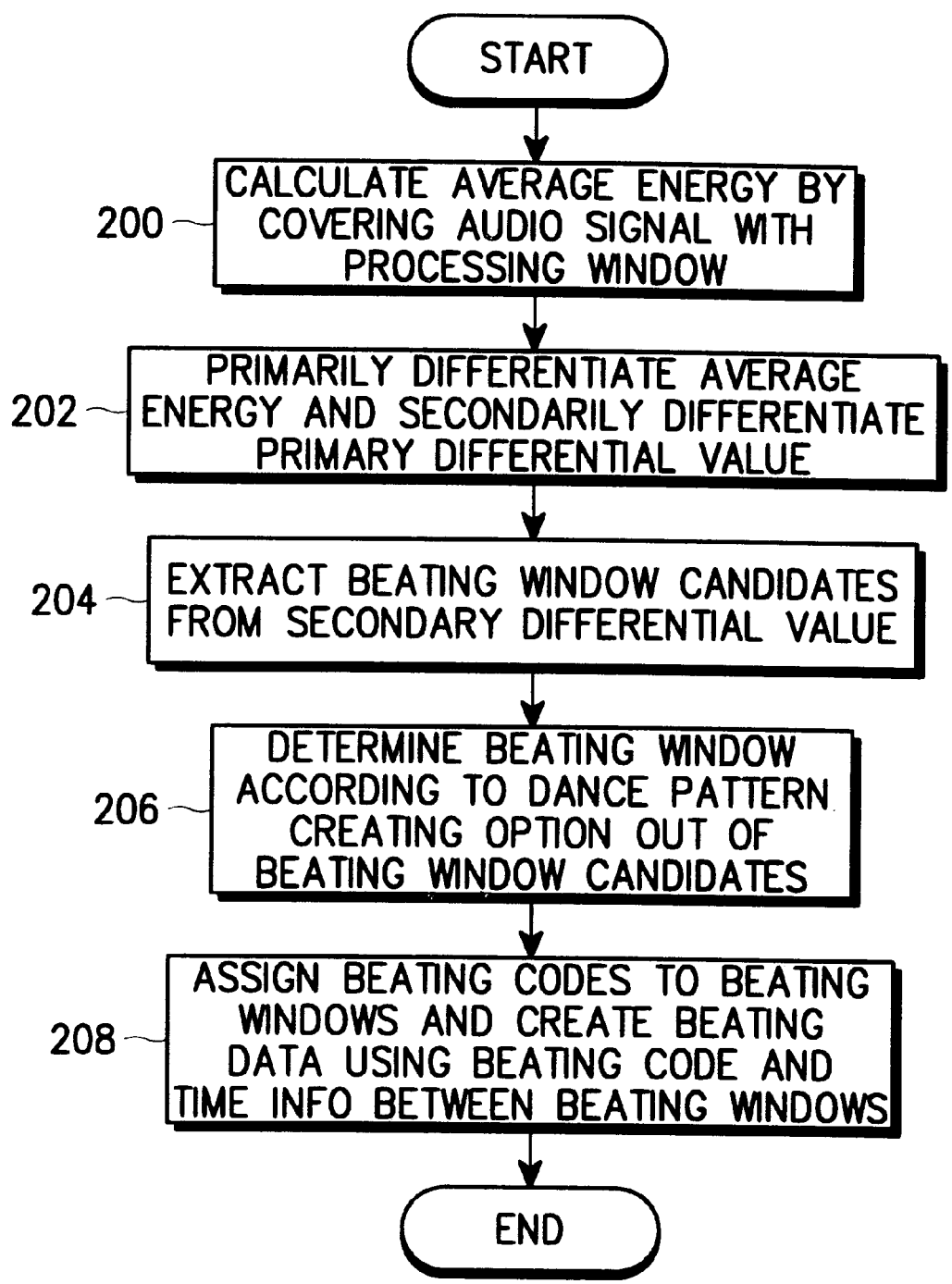
FIG. 3 is a flow chart illustrating a procedure for automatically creating dance patterns according to an embodiment of the present invention.
Figure 4A:
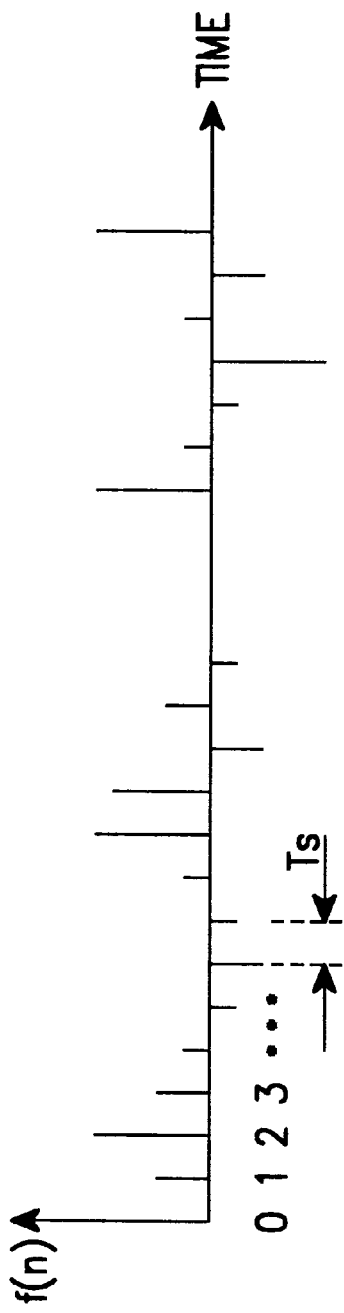
FIGS. 4*a* to 4*c* are diagrams illustrating processing windows used for analyzing a digital audio signal according to an embodiment of the present invention.
Figure 4B:
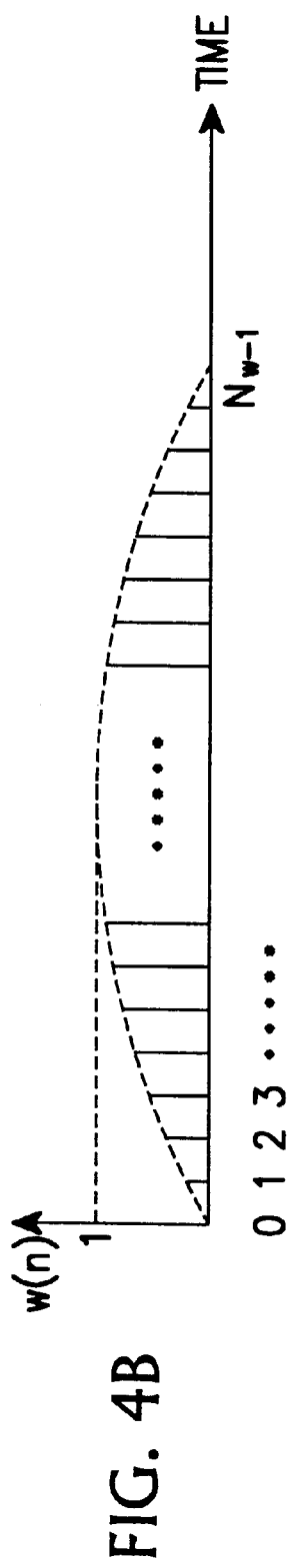
Figure 4C:
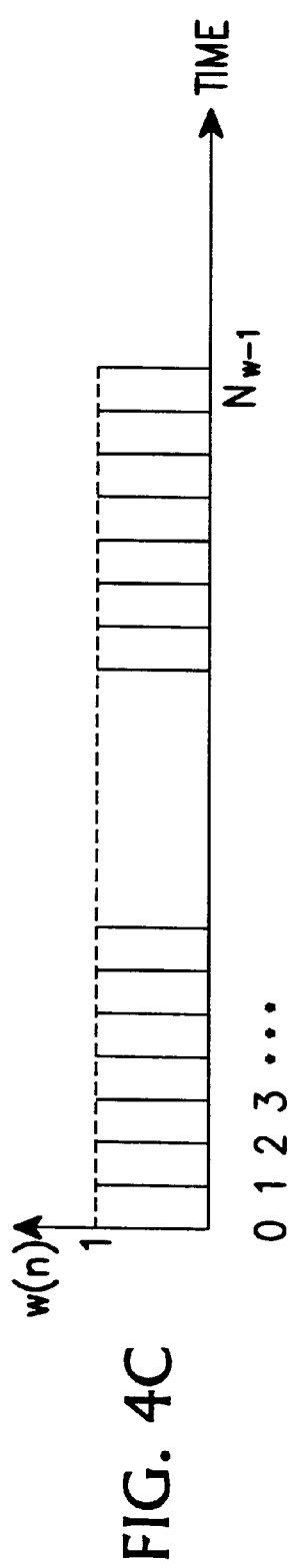

A detailed description of the dance pattern creating operation of step 104 will be made with reference to FIG. 3. In steps 200 to 204, the controller 12 extracts power feature (or information) of the audio signal for each processing window by shifting the processing window covering the digital audio signal of FIG. 4a, read from the audio memory 16, at regular intervals, and extracts (or determines) processing windows indicating parts having strong-beat power features as beating widow candidates. For the processing window, it is possible to use a Hamming window or a Hanning window shown in FIG. 4b, and a rectangular window shown in FIG. 4c. Alternatively, it is also possible to shift the Hamming window or the Hanning window so as to overlap the windows by 50%. The Hamming window is represented by $w(i)=0.54-0.46 \cos(2\pi i/N_{w-1})$, the Hanning window is represented by $w(i)=0.5-0.5 \cos(2\pi i/N_{w-1})$, and the rectangular window is represented by $w(i)=1$. Here, $0 \leq i \leq N_{w-1}$, $T_s=1/f_s$, $w(n)$ indicates a weight coefficient of the window, and $N_w$ indicates a size of the window.

In step 200, the controller 12 calculates an average energy value from a signal obtained by multiplying the audio signal by the processing window. In step 202, the controller 12 primarily differentiates the average energy value and then secondarily differentiates the primary differential value. Thereafter, in step 204, the controller 12 extracts the processing windows having a negative secondary differential value as the beating window candidates. Here, since a processing window having the negative secondary differential value indicates a point having the greatest energy (i.e., a point having the strongest rhythm beat, where beating such as foot-stomping or touching should be conducted) this processing window part is extracted as the beating window candidate. The operation results of steps 200 to 204 are shown in Table 1 below, by way of example. In Table 1, "CA" indicates a candidate.

TABLE 1

| Processing Window No. | 1 | 2 | 3 | 4 | 5 | 6 | 7 | 8 | 9 | 10 | 11 | ... | N |
|---|---|---|---|---|---|---|---|---|---|---|---|---|---|
| Average Energy (dB) | 10 | 15 | 12 | 14 | 32 | 28 | 25 | 10 | 8 | 20 | 13 | ... | |
| Primary Diff. Value | −5 | | 3 | −2 | −18 | 4 | 3 | 15 | 2 | −12 | 7 | | ... |
| Secondary Diff. Value | | −8 | 5 | 16 | −22 | 1 | −12 | 13 | 14 | −19 | | ... | |
| Beating Window | | CA | | | CA | | CA | | | CA | | ... | |

Thereafter, in step 206, the controller 12 determines from the beating window candidates the beating windows corresponding to the points where beating should be conducted according to the dance pattern creating option. In step 208, the controller 12 assigns unique beating codes to the determined beating windows in the order of the dance patterns based on the dance pattern creating option, as shown in Table 2 below, and creates beating data of the dance patterns using the beating codes together with time information between the beating windows.

TABLE 2

| Beating Pattern | Beating Code |
| --- | --- |
| Up | 0000 |
| Down | 0001 |
| Left | 0010 |
| Right | 0011 |
| Up-Down Concurrent | 0100 |
| Up-Left Concurrent | 0101 |
| Up-Right Concurrent | 0110 |
| Down-Left Concurrent | 0111 |
| Down-Right Concurrent | 1000 |
| Left-Right Concurrent | 1001 |

Two time-interval limiting conditions are required in determining the beating windows from the beating window candidates in step 206. Regarding the first time-interval limiting condition, when there is a very short time difference between the beating windows, such as between the window #5 and the window #7 of Table 1, the user may feel that the beats are heard almost concurrently. Accordingly, the controller 12 defines the minimum time interval between the beating data as the first time-interval limiting condition, thereby to determine one of adjacent beating candidates, having the lowest value, as a beating window The second time-interval limiting condition is defined to prevent the dance patterns from not being generated for a long time. The second condition defines a time interval where at least one beating window should exist, i.e., the maximum time interval between the beating data.

Figure 5:
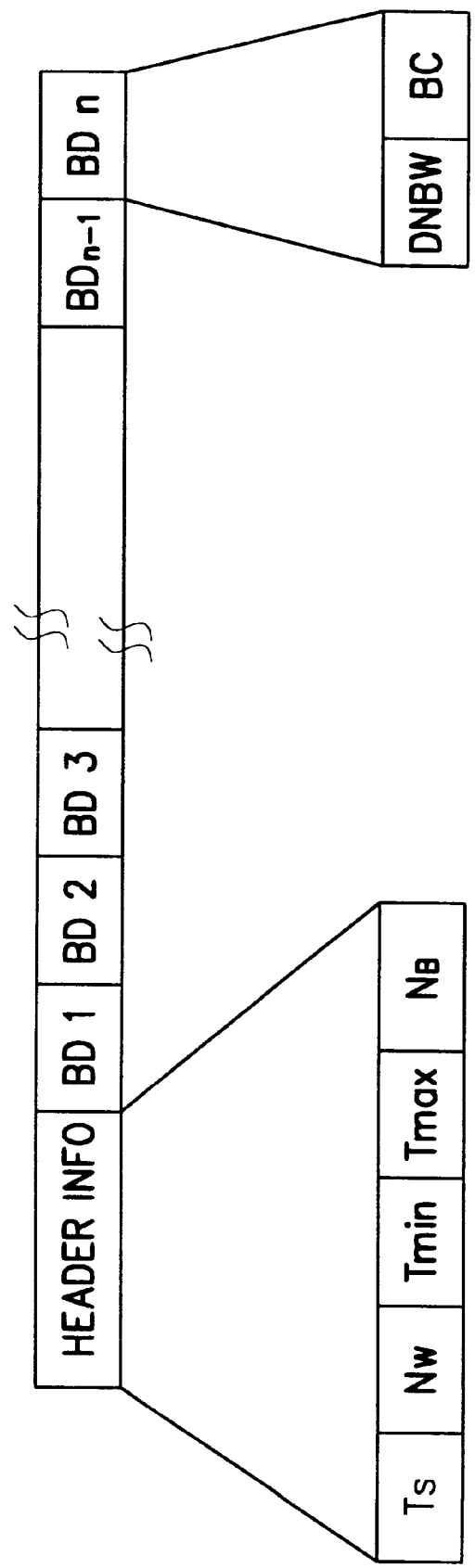
FIG. 5 is a diagram illustrating a beating window data format according to an embodiment of the present invention.

FIG. 5 illustrates a beating window data format for storing beating data of the created dance patterns. The beating window data format is comprised of header information and n beating data BD1–BDn. Here, the header information is comprised of an inter-sample time interval Ts, the number $N_w$ of samples per window, a limited time $T_{min}$ for the minimum interval between beating data, a limited time $T_{max}$ for the maximum interval between beating data, and a beating data number $N_B$. The beating data BD is comprised of DNBW (Difference Number of Beating Window) indicating a difference in the number of the processing windows between a specific beating window and its preceding beating window, and beating code BC. Here, the number $N_{DNBW}$ of bits assigned for the time information DNBW is defined by Equation (1) below.

$$N_{DNBW} = \left[\log_2 \frac{T_{max}}{T_s(N_{w-1})}\right] \quad (1)$$

After creating the dance patterns, the controller 12 displays, in step 106, the created dance patterns on the display 20 while reproducing the audio file and outputting the reproduced audio signal to the speaker 22. If the user clicks in step 108 a key for registering the created dance patterns using the key input unit 10 after checking the displayed dance patterns, then the controller 12 stores the beating data of the dance patterns in the audio memory 16 in the beating window data format of FIG. 5 in association with the audio file. If, however, the user is not satisfied with the dance patterns displayed on the display 20, he may click a key for refusing to register the created dance patterns using the key input unit 10 in step 108. The controller 12 then returns to step 102 and creates new dance patterns by changing the dance pattern creating option.

The user can enjoy the dance game by downloading the created dance patterns into the personal computer, a game apparatus or a mobile telephone.

In this manner, the user can create the dance patterns of even the unregistered music using the audio signal according to various options. Therefore, the user can create the dance patterns of his favored audio files such as an MP3 (MPEG-1 Layer 3) audio file and a wave© audio file, and enjoy the dance game listening to his favored music.

While the invention has been shown and described with reference to a certain preferred embodiment thereof, it will be understood by those skilled in the art that various changes in form and details may be made therein without departing from the spirit and scope of the invention as defined by the appended claims. In particular, although the embodiment of the present invention creates the dance patterns by loading the audio files previously stored in the audio memory 16, it is also possible to create the dance patterns by receiving an audio signal of a specific song on a real-time basis. In this case, it is necessary to define a reference interval, based on which the audio signal is analyzed to create the dance patterns.

What is claimed is:

1. A method for automatically creating dance patterns using an audio signal of music, comprising the steps of:

extracting a power feature of an audio signal of each processing window by covering the audio signal with the processing window for analyzing the audio signal at regular intervals, and extracting the processing windows indicating a part having a strong-beat power feature as beating window candidates;

determining beating windows corresponding to the points where beating should be conducted according to a predetermined dance pattern creating option, out of the beating window candidates; and assigning predetermined unique beating codes to the determined beating windows in order of dance patterns based on the dance pattern creating option, and creating beating data of the dance patterns using the beating codes and time information indicating a time interval between beating windows.

2. The method as claimed in claim 1, wherein the dance pattern creating option includes a genre option of the music and a level option of the dance patterns to be created.

3. The method as claimed in claim 2, wherein the dance pattern creating option further includes a sample frequency option for analyzing the audio signal and a size option of the processing window.

4. The method as claimed in claim 2, wherein the level option of the dance patterns includes a number of concurrently created dance patterns, a number of dance patterns created over one piece of music, and maximum and minimum intervals between the dance patterns.

5. The method as claimed in claim 1, wherein the time information indicates a difference in a number of the processing windows between a specific beating window and its preceding beating window.

6. The method as claimed in claim 1, wherein the beating window extracting step comprises the steps of:

calculating an average energy value of said each processing window;

primarily differentiating the average energy value and then secondarily differentiating the primary differential value; and extracting the processing windows having a negative secondary differential value as the beating window candidates.

7. A method for automatically creating dance patterns using an audio signal of music, comprising the steps of:

selecting a piece of music out of audio files stored in an audio memory and loading the selected music from the audio memory;

inputting a dance pattern creating option for designating an option of creating the dance patterns;

extracting a power feature of an audio signal of a processing window by covering the audio signal with a processing window for analyzing the audio signal at regular intervals, and extracting the processing windows indicating a part having a strong-beat power feature as beating window candidates;

determining beating windows corresponding to points where beating should be conducted according to a predetermined dance pattern creating option, out of the beating window candidates;

assigning predetermined unique beating codes to the determined beating windows in order of dance patterns based on the dance pattern creating option, and creating beating data of the dance patterns using the beating codes and time information indicating a time interval between beating windows;

reproducing the audio file while displaying the created dance patterns; and storing beating data of the created dance patterns in the audio memory in association with the audio file, when a user determines to register the created dance patterns after reproduction of the audio file.

8. The method as claimed in claim 7, wherein the dance pattern creating option includes a genre option of the music and a level option of the dance patterns to be created.

9. The method as claimed in claim 8, wherein the dance pattern creating option further includes a sample frequency option for analyzing the audio signal and a size option of the processing window.

10. The method as claimed in claim 8, wherein the level option of the dance patterns includes a number of concurrently created dance patterns, a number of dance patterns created over one piece of music, and maximum and minimum intervals between the dance patterns.

11. The method as claimed in claim 7, wherein the time information indicates a difference in a number of the processing windows between a specific beating window and its preceding beating window.

12. The method as claimed in claim 7, wherein the beating window extracting step comprises the steps of:

calculating an average energy value of each processing window;

primarily differentiating the average energy value and then secondarily differentiating the primary differential value; and extracting the processing windows having a negative secondary differential value as the beating window candidates.

* * * * *